(12) United States Patent
Ku et al.

(10) Patent No.: US 8,003,267 B2
(45) Date of Patent: Aug. 23, 2011

(54) FLEXIBLE POWER SUPPLY

(75) Inventors: Jie-Ren Ku, Kaohsiung (TW); Chan-Li Hsueh, Kaohsiung County (TW); Ya-Yi Hsu, Tainan County (TW); Cheng-Yen Chen, Yongkang (TW); Shing-Fen Tsai, Tainan County (TW); Reiko Ohara, Tainan (TW); FangHei Tsau, Kaohsiung County (TW); Chien-Chang Hung, Pingtung (TW); Ming-Shan Jeng, Sijhih (TW)

(73) Assignee: Industrial Technology Research Institute (TW)

( * ) Notice: Subject to any disclaimer, the term of this patent is extended or adjusted under 35 U.S.C. 154(b) by 107 days.

(21) Appl. No.: 12/553,442

(22) Filed: Sep. 3, 2009

(65) Prior Publication Data

US 2010/0279183 A1    Nov. 4, 2010

(30) Foreign Application Priority Data

Apr. 29, 2009  (TW) ............................. 98207229 U
Aug. 11, 2009  (TW) ............................. 98214754 U

(51) Int. Cl.
*H01M 8/06* (2006.01)
(52) U.S. Cl. ....................................... 429/416; 429/127
(58) Field of Classification Search .................. 429/127, 429/416, 421
See application file for complete search history.

(56) References Cited

U.S. PATENT DOCUMENTS

| | | | |
|---|---|---|---|
| 5,599,640 A * | 2/1997 | Lee et al. ....................... | 429/421 |
| 6,316,133 B1 * | 11/2001 | Bossel .......................... | 429/421 |
| 7,175,929 B2 * | 2/2007 | Arita et al. ................. | 429/127 X |
| 7,404,842 B1 | 7/2008 | Wainright et al. | |
| 7,510,794 B2 * | 3/2009 | Gottesfeld et al. ........ | 429/127 X |
| 7,622,212 B2 * | 11/2009 | Forte .......................... | 429/127 X |
| 2002/0182459 A1 | 12/2002 | Hockaday et al. | |
| 2002/0182475 A1 | 12/2002 | Pan | |
| 2005/0196666 A1 | 9/2005 | Gottesfeld et al. | |
| 2006/0194098 A1 * | 8/2006 | Chang et al. .................. | 429/127 |
| 2006/0194099 A1 * | 8/2006 | Shu et al. ...................... | 429/127 |
| 2007/0120522 A1 | 5/2007 | Eickhoff | |
| 2008/0044707 A1 | 2/2008 | Chou et al. | |

FOREIGN PATENT DOCUMENTS

| | | |
|---|---|---|
| JP | 2010003456 | 1/2010 |
| TW | I255579 | 5/2006 |

OTHER PUBLICATIONS

Zhang et al., "1kWe sodium borohydride hydrogen generation system Part 1: Experimental Study," ScienceDirect, Journal of Power Sources 165 (2007) 844-853.

(Continued)

*Primary Examiner* — Stephen J. Kalafut
(74) *Attorney, Agent, or Firm* — Lowe Hauptman Ham & Berner, LLP

(57) ABSTRACT

Disclosed is a flexible power supply including a hydrogen supply device connected to a flexible fuel cell, wherein the hydrogen supply device includes a moldable hydrogen fuel. In one embodiment, the flexible fuel cell is a sheet structure, and the hydrogen supply device is a flexible flat bag, wherein the fuel cell and the hydrogen supply device are adhered to complete a sheet of a flexible power supply. The sheet of flexible power supply can be put in the pocket of cloth or baggage, or directly sewn on the outside of cap or overcoat.

13 Claims, 3 Drawing Sheets

OTHER PUBLICATIONS

Prosini et al., "A hydrogen refill for cellular phone," ScienceDirect, Journal of Power Sources 161 (2006) 290-293.
Wainright et al., "Microfabricated fuel cells," ScienceDirect, Electrochimica Acta 48 (2003) 2869-2877.
Jeong et al., "A study on hydrogen generation from NaBH4 solution using the high-performance Co-B catalyst," ScienceDirect, Journal of Power Sources 144 (2005) 129-134.
Wu, "Hydrogen Storage via Sodium Borohydride," Millennium Cell, Apr. 14-15, 2003, pp. 1-22.
Cloutier et al., "Sodium borohydride for hydrogen generation and storage," Engineering Village, Conference: 1st European Fuel Cell Technology and Applications Conference 2005, EFC2005, Dec. 14, 2005-Dec. 16, 2005, pp. 1-2.

* cited by examiner

FLEXIBLE POWER SUPPLY

CROSS REFERENCE TO RELATED APPLICATIONS

This Application claims priorities of Taiwan Patent Application No. 098207229, filed on Apr. 29, 2009, and Taiwan Patent Application No. 098214754, filed on Aug. 11, 2009, entireties of which are incorporated by reference herein.

BACKGROUND OF THE INVENTION

1. Field of the Invention

The present invention relates to a flexible power supply, and in particular relates to a hydrogen supply device and a fuel cell thereof.

2. Description of the Related Art

Modern portable electronic products have lots of functions and suffer short power supplies/rechargers. Moreover, with varied outfit designs, modern portable electronic products require flexible, easy-shaping, and friendly-design power supplies/rechargers to fit their outfits.

The operating time of a portable power supply/recharger can be extended by using proton exchange membrane fuel cell (PEM-FC). However, the portable power supply/recharger made by PEM-FC suffers another drawback. The drawback is that the portable power supply/recharger is easily deformed/damaged due to external forces. The external forces come from all the applied forces during operating, even when a person carry it on moving. Thus, a rigid support is required in conventional portable power supply/recharger to prevent the deformation/damage from external forces. Nevertheless, the rigid support cost the penalty of much over weight and volume of the portable power supply/recharger. Therefore, a flexible and easy-shaping power supply/recharger was invented to reduce the weight, the volume, and the risk of the deformation/damage from the conventional one.

If without rigid support, two of the most easily-deformed/damaged portions of the portable power supply/recharger are: (i) the assembly portion between the proton exchange membrane and the end plates in a PEM-FC. If the assembly portion is deformed/damaged, it will lead to dramatically increase the inner electrical resistance and therefore lower output power. (ii) the connection portion between fuel tank and fuel cell as well as fuel tank itself. If the connection portion or tank is deformed/damaged, it will lead the leakage of hydrogen and as a possible result of a fire.

Accordingly, flexible materials have been applied to portable power supplys/rechargers. Examples of elements of portable power supplys/rechargers made by PEM-FC that may be manufactured by flexible materials include the end plate, polar plate, air diffusion layer, catalyst layer, and proton exchange membrane element. General fuel sources of portable power supplys/rechargers are methanol and hydrogen. Whatever the fuel type, the fuel tank should be rigid other than flexible to promise the fuel will not leak out due to external force. Especially when the hydrogen is directly adopted as fuel, the container for compressed hydrogen storage is heavily rigid and bulky. Additionally, the portable power supply/recharger is not entirely flexible.

In Taiwan Patent No. I255579, a portable fuel cell with high power value per volume/weight is provided. The fuel cell has a flexible or closed-ring electrolyte membrane and a plurality of separated reaction elements in series connection disposed on the electrolyte membrane. The electrolyte membrane is applied as proton exchange and a conductor of ions. Each of the reaction elements comprises flexible internal and external reaction bilks disposed on inner and outer sides of the electrolyte membrane, respectively. The internal reaction bulk receives hydrogen from the fuel supply element to process an electrochemical reaction, and the external reaction bulk receives oxygen from the surroundings to process an electrochemical reaction to produce a high voltage for output to electronic products. The described fuel cell utilizes a flexible or closed-ring electrolyte membrane. However, the fuel supply of the fuel cell is methanol, and is not a flexible hydrogen supply element. It is obvious that the cell still needs a rigid fuel tank, and difficult to solve the problems come from the external force.

Accordingly, a flexible power supply/recharger is called for application in portable electronic products.

BRIEF SUMMARY OF THE INVENTION

The invention provides a flexible power supply/recharger, comprising a flexible fuel cell connected to a hydrogen supply device, wherein the hydrogen supply device comprises a moldable hydrogen fuel. The moldable hydrogen fuel comprises a solid hydride, a solid catalyst, and a hydrophobic elastomer polymer. The flexible fuel cell is a multi-layered structure sequentially composed of a top end plate, an air flow field plate, a membrane electrode assembly, a hydrogen flow field plate, and a bottom end plate, and all of these components are flexible. The membrane electrode assembly comprises a proton exchange membrane disposed between a catalyst layer and a diffusion layer.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
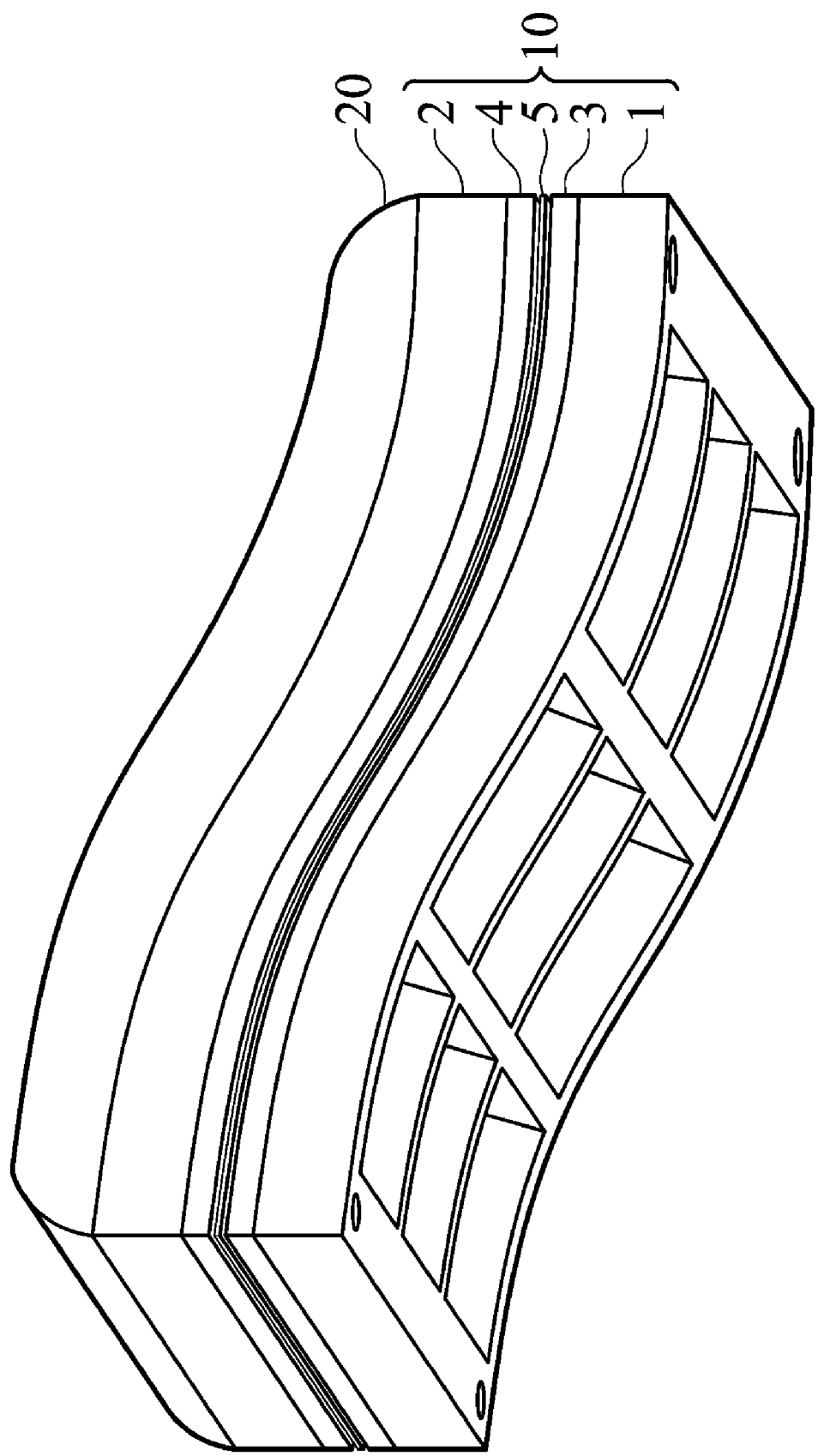
FIGS. 1A-1B are schematic views showing the power supply in one embodiment of the invention.
Figure 1B:
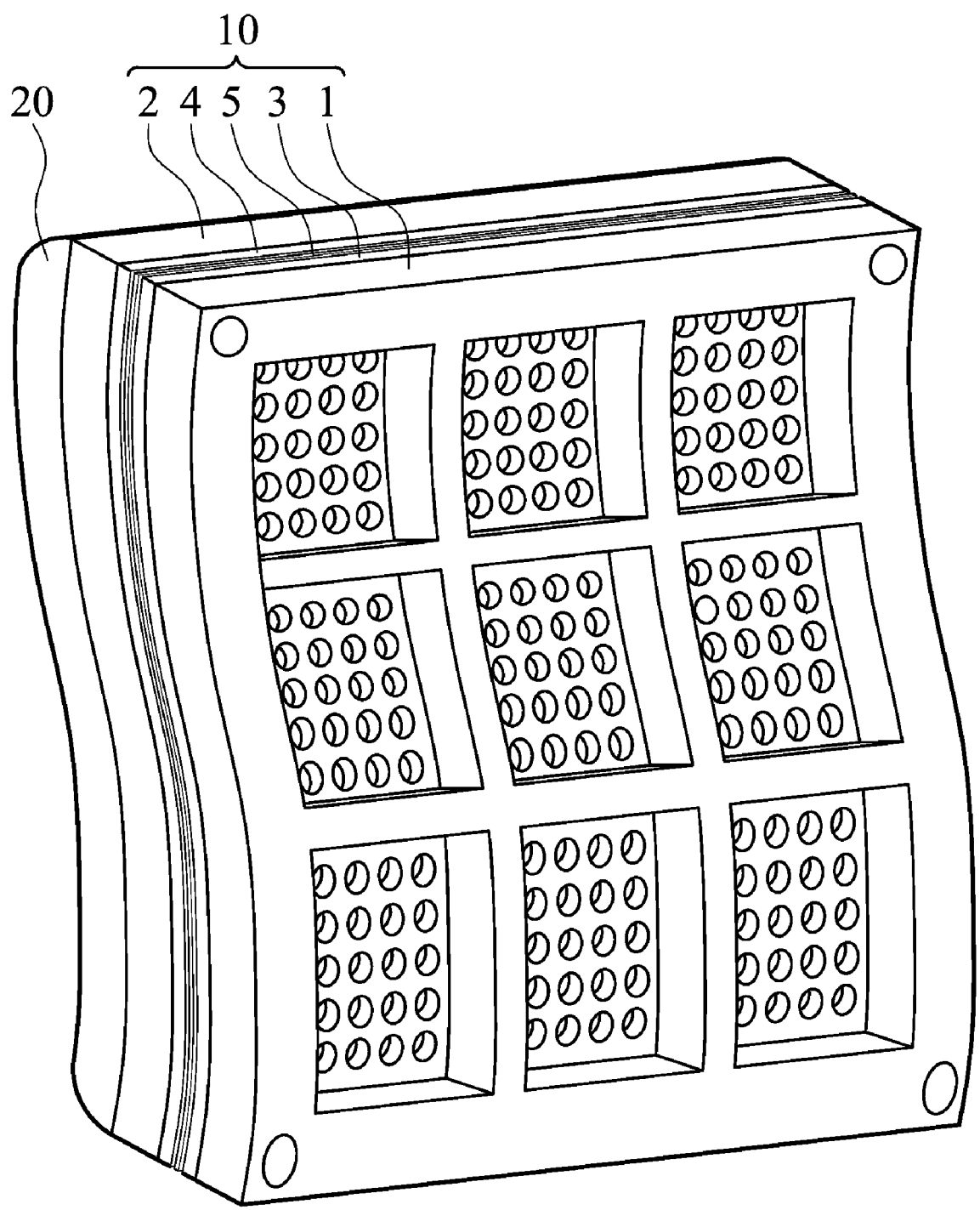
Figure 2:
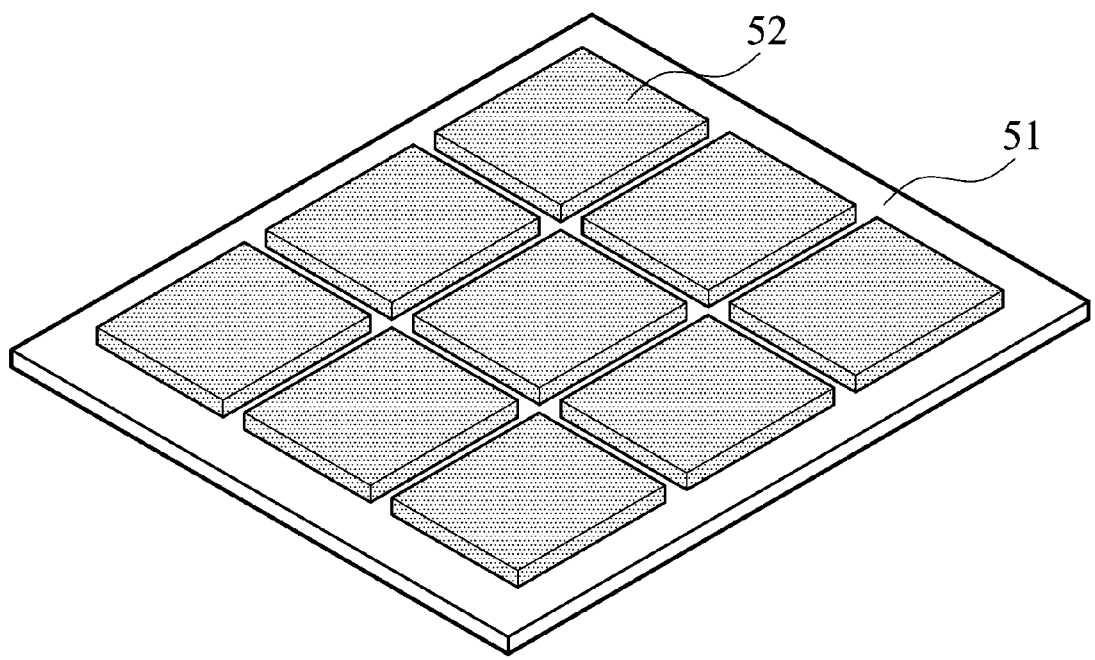
FIG. 2 is a schematic view showing the membrane electrode assembly in one embodiment of the invention.
Figure 3:
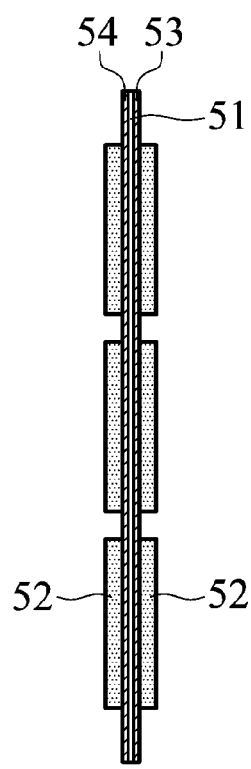
FIG. 3 is a cross section of the membrane electrode assembly in one embodiment of the invention.

The invention provides a flexible power supply including a flexible fuel cell 10 connected to a hydrogen supply device 20, wherein the hydrogen 20 is a flexible material and further contains moldable hydrogen fuel. FIGS. 1A-1B are schematic views showing the flexible power supply of the invention. In the flexible fuel cell 10, an air flow field plate 3, a hydrogen flow field plate 4, and a membrane electrode assembly 5 are disposed between the end plates 1 and 2, connected to the hydrogen supply 20. The end plates 1 and 2 are flexible material such as plastic plate, rubber plate, metal plate, or metal mesh plate. The air flow field plate 3 and the hydrogen flow field plate 4 are flexible insulation material such as printed circuit board, rubber plate, plastic plate, or insulation-treated metal plate. The flow field plates do not react with hydrogen or oxygen, and has a conductive circuit on it. The conductive circuit on the flow field plates may conduct current from flexible electrode elements to an external circuit. The membrane electrode assembly 5 includes flexible electrode elements 52 composed of a soft or flexible conductor such as conductive composite bulk, e.g. carbon fiber cluster, conductive polymer, carbon fabric, and/or carbon powder. The flexible electrode elements 52 are conductive, even if deformed, thereby providing a soft electrical connection between the conductive circuit on the air/hydrogen flow field plates and the membrane electrode assembly 5. As shown in FIG. 2, the electricity produced from the reaction in the membrane electrode assembly 5 is collected by the flexible electrode element 52 and then output to the conductive circuit on the air/hydrogen flow field plates 3 and 4. The membrane exchange assembly 5 is shown in FIG. 3, the proton exchange membrane 51 is disposed between catalyst layers 53 and 54. The hydrogen from the hydrogen supply device 20 flows through the hydrogen flow path to the contact catalyst layer 54 for forming protons and electrons. The protons penetrate through the proton exchange membrane 51 to react with the oxygen in the catalyst layer 53, and the electrons flows through the external circuit to connect to the portable electronic device or battery. The proton exchange membrane can be a commercially available product, such as those from Dupont, Dow, Gore, Asahi Glass, Asahi Chemical, and the likes. In one embodiment, the membrane electrode assembly 5 may further include a commercially available three-layered or five-layered structure, such as additional catalyst layers and/or diffusion layers. The membrane electrode assembly 5 composed of the proton exchange membrane 51 and the catalyst layers 53 and 54 is flexible. The flexible fuel cell of the invention is obtained after the membrane electrode assembly 5 is disposed between the flexible end plates 1 and 2, the air flow field plate 3, and the hydrogen flow field plate 4.

The moldable solid hydrogen fuel of the invention includes a solid catalyst, a solid hydride, and a hydrophobic elastomer polymer. The solid hydride can be alkali/alkaline metal boron hydride, metal hydride, boron nitrogen hydride, or combinations thereof. The metal boron hydride includes $NaBH_4$, $LiBH_4$, $Ca(BH_4)_2$, $MgBH_4$, $KBH_4$, or $Al(BH_4)_3$. The metal hydride includes LiH, NaH, or $CaH_2$ and the boron nitrogen hydride includes ammonia borane, diborane, diamino diborane, $H_2B(NH_3)_2BH_4$, poly(amino borane), borazine, a borane-morpholine complex, or a borane-tetrahydrofuran complex. The solid catalyst can be ruthenium, cobalt, nickel, copper, iron, ruthenium ion, cobalt ion, nickel ion, copper ion, iron ion, or combinations thereof, and the hydrophobic elastomer polymer includes silicone, rubber, or silicone rubber. The solid catalyst and the solid hydride are ball-grinded at high speeds, and then added the hydrophobic elastomer polymer to complete the moldable solid hydrogen fuel. For the detailed formula and manufacturing method thereof, reference can be made to Taiwan Patent Application No. 98108205.

The moldable hydrogen fuel is charged in a hydrogen supply device 20 connected to the hydrogen flow field plate 4. The hydrogen supply device 20 will generate hydrogen after being added water. The hydrogen supply device 20 is a flexible pack such as a plastic, rubber, Nylon, or air-proof bag pack. In one embodiment, the fuel cell is a flexible sheet structure, and the hydrogen supply device 20 is a flexible flat bag adhered to the flexible sheet fuel cell. In this embodiment, the moldable hydrogen fuel is a sheet having a size slightly smaller than the hydrogen supply device 20. The moldable hydrogen fuel is rolled to be tubular and stored in water-proof bag, and spread to be put into the hydrogen supply device 20. After adding water to the hydrogen supply device 20 containing the hydrogen fuel, the hydrogen is generated. Because the power supply composed of the fuel cell 10 and the hydrogen supply device 20 is a flexible sheet structure, it can be put in the pocket of clothes or baggage, or directly sewn on the outside of a cap or overcoat. Because the power supply is flexible, the conductivity of inner circuit inside PEM-FC or the hydrogen seal thereof are not easily damaged by external forces. Compared to a conventional power supply/recharger, the power supply/recharger of the invention has a sheet structure which is not the structure such as a cylinder or lump shape. Thus, the power supply/recharger invented enhances its applicability and portability.

To prevent water in hydrogen supply device 20 from flowing into the fuel cell, water absorbent material such as polyacrylate, poly(ethylene glycol), ethylene vinyl acetate, polyurethane, poly(ethylene oxide), starch graft copolymer, or rubber blend can be filled into the inner side of the hydrogen supply device. As such, the water added to the hydrogen supply device is a non-flowable gel type liquid.

EXAMPLE

The membrane electrode used in this example is NRE211 (commercially available from Dupont). The catalyst layer and the diffusion layer used is a combined product GDE BASF LT121EW (commercially available from E-tek) which was cut to fit the metal conductive electrode of the air/hydrogen flow field plate. The proton exchange membrane NRE211 and the catalyst/diffusion layer LT121EW were laminated by a thermal press at about 130 to 140 for 1 minute. A flexible conductive carbon fabric serving as the flexible electrode element 52 was cut to fit and adhered to the metal conductive electrode of the air/hydrogen flow field plate. The membrane electrode assembly, the flexible electrode element, the air flow field plate, and the hydrogen flow field plate, and optional polar plate (not necessary) were adhered and fastened by instant glue, and the peripheral thereof was sealed by gel. The air flow field plate directly touched the air. The hydrogen flow field plate was connected to a flexible bag hydrogen supply device, wherein the connection was adhered by instant glue, sealed by gel, and fastened by thin steel plate. As such, a flexible power supply with iron frame was completed.

While the invention has been described by the way of the example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:
1. A flexible power supply, comprising:
a hydrogen supply device, comprising a moldable hydrogen fuel, wherein the moldable hydrogen fuel comprises a solid hydride, a solid catalyst, and a hydrophobic elastomer polymer; and
a flexible fuel cell connected to the hydrogen supply device, wherein the flexible fuel cell is a multi-layered structure sequentially composed of a top end plate, an air flow field plate, a first flexible electrode element, a membrane electrode assembly, a second flexible electrode element, a hydrogen flow field plate, and a bottom end plate, wherein the membrane electrode assembly comprises a proton exchange membrane disposed between two catalyst layers.

2. The flexible power supply as claimed in claim 1, being a planar structure.

3. The flexible power supply as claimed in claim 1, wherein the top end plate and/or bottom end plate comprises plastic plate, rubber plate, metal plate, or metal mesh plate.

4. The flexible power supply as claimed in claim 1, wherein the air flow field plate and/or the hydrogen flow field plate comprises circuit plate, plastic plate, rubber plate, or insulation-treated metal plate.

5. The flexible power supply as claimed in claim 1, wherein the membrane electrode assembly further comprises diffusion layers.

6. The flexible power supply as claimed in claim 1, wherein the first and second flexible electrode elements are composed of a composite conductive material, and the composite conductive material comprises carbon fiber cluster, conductive polymer, carbon fabric, and/or carbon powder.

7. The flexible power supply as claimed in claim 1, wherein the solid hydride comprises metal boron hydride, metal hydride, boron nitrogen hydride, or combinations thereof.

8. The flexible power supply as claimed in claim 1, wherein the solid catalyst comprises ruthenium, cobalt, nickel, copper, iron, ruthenium ion, cobalt ion, nickel ion, copper ion, iron ion, or combinations thereof.

9. The flexible power supply as claimed in claim 1, wherein the hydrophobic elastomer polymer comprises silicone, rubber, or silicone rubber.

10. The flexible power supply as claimed in claim 1, wherein the hydrogen supply device comprises plastic, rubber, polyamide, or air-proof bag pack.

11. The flexible power supply as claimed in claim 1, wherein the flexible fuel cell has a sheet structure.

12. The flexible power supply as claimed in claim 11, wherein the hydrogen supply device is a flexible flat bag adhering to the flexible fuel cell.

13. The flexible power supply as claimed in claim 1, wherein the hydrogen supply device further comprises a water absorbent material or polymer.

* * * * *